US012599794B2

(12) United States Patent
Saarikoski et al.

(10) Patent No.: US 12,599,794 B2
(45) Date of Patent: Apr. 14, 2026

(54) UPRIGHT SPRINKLER AND A SPRINKLER SYSTEM

(71) Applicants: Tuomas Saarikoski, Helsinki (FI); Samuli Järvinen, Espoo (FI)

(72) Inventors: Tuomas Saarikoski, Helsinki (FI); Samuli Järvinen, Espoo (FI)

(73) Assignee: MARIOFF CORPORATION OY, Vantaa (FI)

( * ) Notice: Subject to any disclaimer, the term of this patent is extended or adjusted under 35 U.S.C. 154(b) by 78 days.

(21) Appl. No.: 18/598,211

(22) Filed: Mar. 7, 2024

(65) Prior Publication Data

US 2025/0281783 A1 Sep. 11, 2025

Related U.S. Application Data

(60) Provisional application No. 63/489,443, filed on Mar. 10, 2023.

(51) Int. Cl.

*A62C 31/02* (2006.01)
*A62C 2/24* (2006.01)
*A62C 35/60* (2006.01)
*A62C 35/68* (2006.01)
*A62C 37/14* (2006.01)

(52) U.S. Cl.

CPC ................ *A62C 31/02* (2013.01); *A62C 2/24* (2013.01); *A62C 2/241* (2013.01); *A62C 2/243* (2013.01); *A62C 35/60* (2013.01); *A62C 35/68* (2013.01); *A62C 37/14* (2013.01)

(58) Field of Classification Search

CPC ........... A62C 2/24; A62C 2/241; A62C 2/243; A62C 31/02; A62C 5/60; A62C 35/68; A62C 37/14

See application file for complete search history.

(56) References Cited

U.S. PATENT DOCUMENTS 9,539,451 B1 * 1/2017 Walker .................... B05B 1/326
2009/0166047 A1 * 7/2009 Sundholm ............. A62C 35/58 169/37
2023/0061990 A1 3/2023 Järvinen

FOREIGN PATENT DOCUMENTS

FR 2808229 B1 * 4/2000 ............ A62C 31/05

OTHER PUBLICATIONS

European Search Report for Application No. 24159164.3, Issued Jun. 21, 2024, 6 Pages.

* cited by examiner

*Primary Examiner* — Kyle Robert Thomas
(74) *Attorney, Agent, or Firm* — CANTOR COLBURN LLP

(57) ABSTRACT

An upright sprinkler is disclosed. The sprinkler comprises a housing having a conduit extending therethrough, a heat-sensitive valve assembly configured above the conduit, and a nozzle arrangement configured below the conduit. The nozzle arrangement is fluidically connected to the conduit via the valve assembly, such that actuation of the valve assembly enables the flow of a fluid from the conduit to the nozzle arrangement via the valve assembly and further sprays the fluid at different downward-facing angles through the nozzle arrangement.

20 Claims, 3 Drawing Sheets

UPRIGHT SPRINKLER AND A SPRINKLER SYSTEM

CROSS-REFERENCE TO RELATED APPLICATION

This patent application claims the benefit of U.S. Provisional Patent Application No. 63/489,443, filed on Mar. 10, 2023, which is incorporated by reference herein in its entirety.

BACKGROUND

This invention relates to the field of sprinklers, and more particularly, a simple, improved, and efficient upright sprinkler and sprinkler system Conventional upright sprinkler designs position a heat-sensitive activation member and a nozzle arrangement above a water distribution pipe. As a result, the pipe may cause significant shadowing to the spray pattern especially if the pipe is close to the ceiling. In addition, direct downward spraying or spraying underneath the sprinkler may be difficult to achieve in conventional upright sprinklers. Moreover, the nozzle arrangement and the heat-sensitive member are built into the sprinkler body of conventional upright sprinklers, which may also lead to the requirement of different sprinkler variations for separate sprinkler versions and different spray patterns.

SUMMARY

Described herein is a sprinkler. The sprinkler comprises a housing comprising a conduit extending therethrough, a heat-sensitive valve assembly configured above the conduit, and a nozzle arrangement comprising one or more orifices configured below the conduit, wherein the nozzle arrangement is fluidically connected to the conduit via the valve assembly, such that actuation of the valve assembly enables flow of a fluid from the conduit to the nozzle arrangement via the valve assembly and further sprays the fluid through the nozzle arrangement.

In one or more embodiments, the housing comprises one or more channels extending between the conduit and the nozzle arrangement within the housing, to fluidically connect the nozzle arrangement to the conduit.

In one or more embodiments, the one or more channels comprise a first fluidic path that extends upward from the conduit and at least one second fluidic path that diverges downward from the first fluidic path into the nozzle arrangement.

In one or more embodiments, the valve assembly comprises a filter plug comprising one or more openings, the filter plug is adapted to be disposed of within at least a portion of the one or more channels such that the nozzle arrangement remains fluidically connected to the conduit via the one or more openings of the filter plug, and a spindle coaxially disposed of within the filter plug, wherein the spindle is configured to move between a deactivated position where the spindle blocks the one or more openings of the filter plug to fluidically disconnect the nozzle arrangement from the conduit, and an activated position where the spindle moves away from the deactivated position to unblock the one or more openings of the filter plug and fluidically connect the conduit with the nozzle arrangement.

In one or more embodiments, the valve assembly comprises a heat-sensitive element connected to the spindle and configured to retain the spindle in the deactivated position, and wherein when a temperature of the heat-sensitive element exceeds a predefined value, the heat-sensitive element is adapted to deform or break, thereby enabling automated movement of the spindle to the activated position.

In one or more embodiments, the valve assembly comprises a frame accommodating the heat sensitive element, the filter plug, and the spindle, wherein the frame facilitates coupling of the valve assembly to a top end of the housing.

In one or more embodiments, the heat-sensitive element is configured between a first end of the spindle and a top inner side of the frame, wherein a second end of the spindle is movably disposed of within the filter plug using a biasing element such that upon the deforming or breaking of the heat sensitive element, the biasing element and/or a pressurized fluid present in the conduit enables automated movement of the spindle to the activated position.

In one or more embodiments, the heat-sensitive element is a bulb filled with a heat-sensitive material that is adapted to explode or expand to break the glass when the temperature of the heat-sensitive material exceeds the predefined value.

In one or more embodiments, the heat-sensitive element is a fusible material that is adapted to deform or break when the temperature of the fusible material exceeds the predefined value.

In one or more embodiments, the valve assembly comprises a filter mesh configured at the one or more openings of the filter plug.

In one or more embodiments, the valve assembly is adapted to be removably coupled to a top end of the housing such that the conduit remains fluidically connected to the one or more channels and the nozzle arrangement via the valve assembly.

In one or more embodiments, the nozzle arrangement is adapted to be removably coupled to a bottom end of the housing such that the nozzle arrangement remains fluidically connected to the one or more channels.

In one or more embodiments, the nozzle arrangement is removably coupled to a bottom end of the housing such that actuation of the valve assembly enables spraying of the fluid, through the nozzle arrangement, at predefined angles in a downward direction.

In one or more embodiments, the conduit comprises an inlet and an outlet that are adapted to be fluidically coupled to a fluid source.

In one or more embodiments, the sprinkler is fluidically connected to the fluid source by a dry conduit system comprising an isolation valve, wherein the conduit of the sprinkler and the dry conduit system is filled with a pressurized gas that facilitates actuation of the isolation valve to a closed position to restrict the flow of the fluid between the fluid source and the sprinkler when the temperature of the heat-sensitive element associated with the sprinkler is below the predefined value.

In one or more embodiments, when the temperature of the heat-sensitive element associated with the sprinkler exceeds the predefined value, the sprinkler is configured to release the pressurized gas via the nozzle arrangement which facilitates actuation of the isolation valve to an open position to allow the flow of the fluid from the fluid source to the nozzle arrangement through the conduit system.

Also described herein is a sprinkler system. The sprinkler system comprises one or more sprinklers fluidically connected to each other and a fluid source, wherein each of the sprinklers comprises a housing comprising a conduit extending therethrough, a heat-sensitive valve assembly configured above the conduit, and a nozzle arrangement comprising one or more orifices configured below the conduit, wherein the nozzle arrangement is fluidically connected to the conduit via the valve assembly, such that actuation of the valve assembly enables flow of a fluid from the conduit to the nozzle arrangement via the valve assembly and further sprays the fluid through the nozzle arrangement.

In one or more embodiments, the conduit of each of the sprinklers comprises an inlet and an outlet that facilitates fluidic coupling of the one or more sprinklers with each other and the fluid source.

In one or more embodiments, the one or more sprinklers are fluidically connected to the fluid source by a dry conduit system comprising an isolation valve, wherein the conduit of each of the sprinklers and the dry conduit system is filled with a pressurized gas that facilitates actuation of the isolation valve to a closed position to restrict the flow of the fluid between the fluid source and the one or more sprinklers when the temperature of the heat-sensitive element associated with the corresponding sprinkler is below the predefined value, and wherein when the temperature of the heat-sensitive element associated with any of the one or more sprinklers exceeds the predefined value, the corresponding sprinklers are configured to release the pressurized gas via the nozzle arrangement which facilitates actuation of the isolation valve to an open position to allow the flow of the fluid from the fluid source to the nozzle arrangement through the conduit system.

In one or more embodiments, the housing of each of the sprinklers comprises one or more channels extending between the conduit and the nozzle arrangement within the housing, to fluidically connect the nozzle arrangement to the conduit, wherein the one or more channels comprise a first fluidic path that extends upward from the conduit and at least one second fluidic path that diverges downward from the first fluidic path into the nozzle arrangement.

The foregoing summary is illustrative only and is not intended to be in any way limiting. In addition to the illustrative aspects, embodiments, and features described above, further aspects, embodiments, features, and techniques of the invention will become more apparent from the following description taken in conjunction with the drawings.

BRIEF DESCRIPTION OF THE DRAWINGS

The accompanying drawings are included to provide a further understanding of the subject disclosure of this invention and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
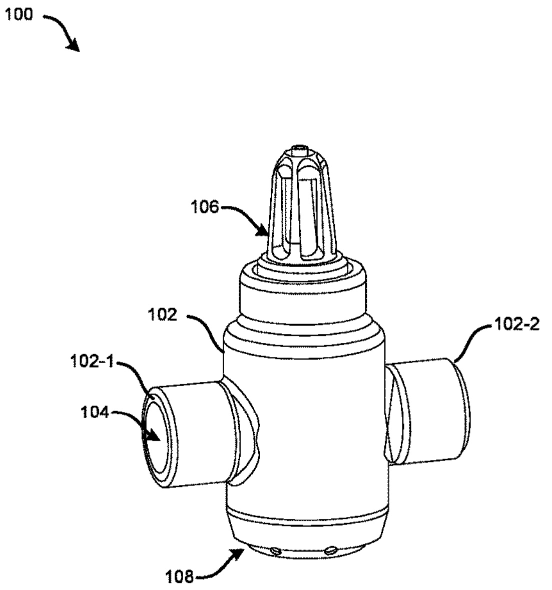
FIG. 1A illustrates an exemplary isometric view of the sprinkler, in accordance with one or more embodiments of the disclosure.
Figure 1B:
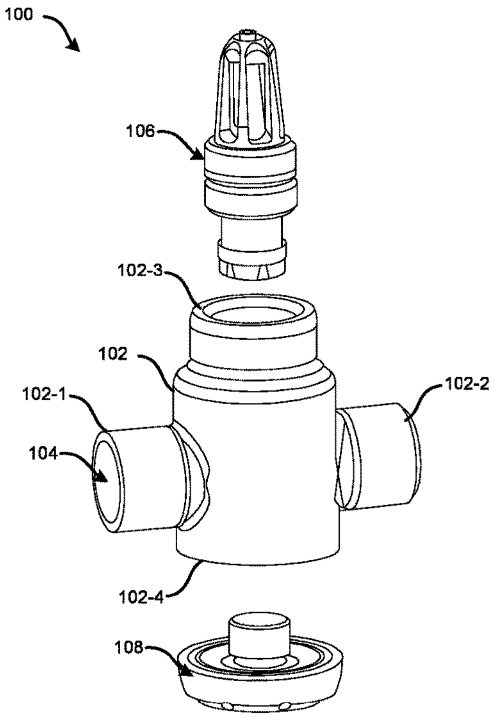
FIG. 1B illustrates an exemplary exploded view of the sprinkler of FIG. 1A.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

In the specification, reference may be made to the spatial relationships between various components and to the spatial orientation of various aspects of components as the devices are depicted in the attached drawings. However, as will be recognized by those skilled in the art after a complete reading of the subject disclosure, the components of this invention. described herein may be positioned in any desired orientation. Thus, the use of terms such as “above,” “below,” “upper,” “lower,” “first”, “second” or other like terms to describe a spatial relationship between various components or to describe the spatial orientation of aspects of such components should be understood to describe a relative relationship between the components or spatial orientation of aspects of such components, respectively, housing, nozzle arrangement, heat-sensitive valve assembly, and corresponding components, described herein may be oriented in any desired direction.

Sprinklers are devices that may be used to spray or distribute water over a designated area for fire suppression or irrigation. Sprinklers typically consist of a pipe system that is connected to a water source and equipped with valves, nozzle arrangements, and other components that may regulate the flow and distribution of water. Sprinklers may be generally classified as pendant sprinklers and upright sprinklers. As the pendant sprinklers generally point downward so they may not be used in freezing areas, even with dry pipes as the sprinkler points downwards, water may remain collected inside the pipe and may not work at all in freezing temperatures. To overcome the water accumulation issue, upright sprinklers are generally employed, especially in cold areas.

Existing upright sprinkler designs position a heat-sensitive activation member and a nozzle arrangement above a water distribution pipe. As a result, the pipe may cause significant shadowing to the spray pattern especially if the pipe is close to the ceiling. In addition, downward spraying may be difficult to achieve in existing upright sprinklers. Moreover, the nozzle arrangement and the heat-sensitive member are built into the sprinkler body of conventional upright sprinklers, which may also lead to the employment of different sprinkler variations for separate sprinkler versions and different spray patterns. Further, the existing sprinkler designs may restrict the replacement or removal of the nozzle arrangement from the sprinkler body when the sprinkler is connected to a dry or wet conduit system in an operating state. Thus, there is a need to restrict spray pattern shadowing and achieve downward spraying in upright sprinklers. Further, there is a need to provide a simple, efficient, and easily operable upright sprinkler design that allows easier replacement of heat-sensitive members and nozzle arrangements from the sprinkler body for different sprinkler variations and different spray patterns, without completely replacing the overall sprinkler.

This invention provides a simple, reliable, efficient, and cost-effective upright sprinkler that enables downward spraying at all angles and has no spray pattern shadowing or obstruction issues. In addition, the upright sprinkler allows easier replacement of the heat-sensitive member and the nozzle arrangement from the sprinkler body for different sprinkler variations and different spray patterns, without completely replacing the overall sprinkler. The sprinkler may include a housing (sprinkler body) comprising a conduit extending therethrough. Further, the heat-sensitive valve assembly (heat-sensitive member) may be configured above the conduit, and the nozzle arrangement may be configured below the conduit. The nozzle arrangement may be fluidically connected to the conduit via the valve assembly, such that actuation of the valve assembly enables the flow of fluid (water) from the conduit to the nozzle arrangement via the valve assembly and further sprays the fluid, through the nozzle arrangement, in all downward facing angles. In addition, as the nozzle arrangement is at the bottom, the spray pattern from the nozzle arrangement remains unobstructed, thereby overcoming the spray pattern shadowing issues. Moreover, the heat-sensitive valve assembly and the nozzle arrangement may be adapted to be removably coupled to the housing, which may allow easier replacement of the heat-sensitive valve assembly and the nozzle arrangement for different sprinkler variations and different spray patterns, without completely replacing the overall sprinkler. The sprinkler also allows the replacement of the nozzle arrangement from the housing when the sprinkler is in a pressurized state or when installed.

Referring to FIGS. 1A to 2D, the upright sprinkler 100 "sprinkler 100" is disclosed. The sprinkler 100 can include a housing 102 (also referred to as sprinkler body, herein) that may include a conduit 104 extending therethrough. The conduit 104 may extend horizontally along a horizontal axis A-A', such that an inlet 102-1 and outlet 102-2 of the conduit 104 remain on two opposite sides of the housing 102. The sprinkler 100 may further include a heat-sensitive valve assembly 106 configured above the conduit 104, and a nozzle arrangement 108 having multiple orifices/holes 108-1 configured below the conduit 104. The nozzle arrangement 108 may be fluidically connected to the conduit 104 via the valve assembly 106 within the housing 102, such that actuation of the valve assembly 106 may enable the flow of a fluid from the conduit 104 to the nozzle arrangement 108 via a portion of the valve assembly 106 and further sprays the fluid through the nozzle arrangement 108. In one or more embodiments, the fluid may be water, air, and fire-retardant liquid or gas, but not limited to the like.

In one or more embodiments, the sprinkler 100 may further include a first opening at the top end 102-3 and a second opening at the bottom end 102-4 of the housing 102. Further, the valve assembly 106 may be adapted to be removably coupled to the first opening at the top end 102-3 of the housing 102 and the nozzle arrangement 108 may be adapted to be removably coupled to the second opening at the bottom end 102-4 of the housing 102. However, in other embodiments, the valve assembly 106 and the nozzle arrangement 108 may also be an integral part of the housing 102 or may be built into the housing 102.

The housing 102 may include one or more channels 110 extending between the conduit 104 and the nozzle arrangement 108 within the housing 102, to fluidically connect the nozzle arrangement 108 to the conduit 104 via a portion of the valve assembly 106. In one or more embodiments, the channel(s) may include a first fluidic path 110-1 that may extend perpendicularly upward from the conduit 104 along a vertical axis B-B' and at least one second fluidic paths 110-2, and/or 110-3 that may diverge downward from the first fluidic path 110-1, each extending around the conduit 104, into the nozzle arrangement 108. However, the channels 110 may also extend in a different arrangement between the conduit 104 and the nozzle arrangement 108 via the valve assembly 106.

The heat-sensitive valve assembly "valve assembly" 106 may include a filter plug 202 comprising one or more openings 202-1 to 202-3, which may be adapted to be disposed of within a portion of the one or more channels 110 within the housing 102 such that the nozzle arrangement 108 remains fluidically connected to the conduit 104 via the one or more openings 202-1 to 202-3 of the filter plug 202. In one or more embodiments, the filter plug 202 may have an annular body comprising a channel, one plug opening 202-1 at the bottom of the filter plug 202, and two plug openings 202-2, 202-3 on two opposite lateral sides of the filter plug 202. The filter plug 202 may be coaxially disposed of within the housing 102, along the vertical axis B-B', from the top end of the housing 102, such that the bottom plug opening 202-1 of the filter plug 202 may be fluidically connected to the first fluidic path 110-1 of the housing 102 and each of the two lateral plug openings 202-2, 202-3 of the filter plug 202 may be fluidically connected to the second fluidic paths 110-2, 110-3 respectively of the housing 102, thereby fluidically connecting the first fluidic path 110-1 to the second fluidic paths 110-2, 110-3 or fluidically connecting the conduit 104 to the nozzle arrangement 108. The valve assembly 106 may further include a filter mesh configured at each opening 202-1 to 202-3 of the filter plug 202.

Figure 2A:
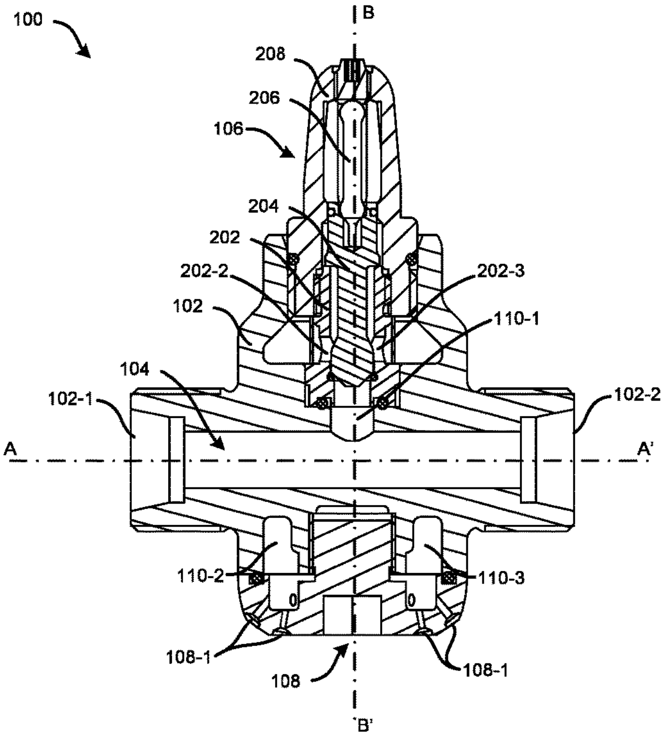
FIGS. 2A and 2B illustrate exemplary cross-sectional views of the sprinkler of FIG. 1A in a deactivated state, respectively, in accordance with one or more embodiments of the disclosure.
Figure 2B:
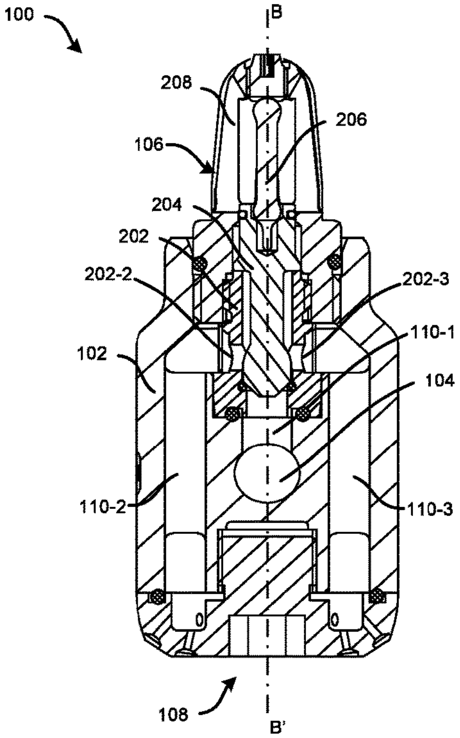
Figure 2C:
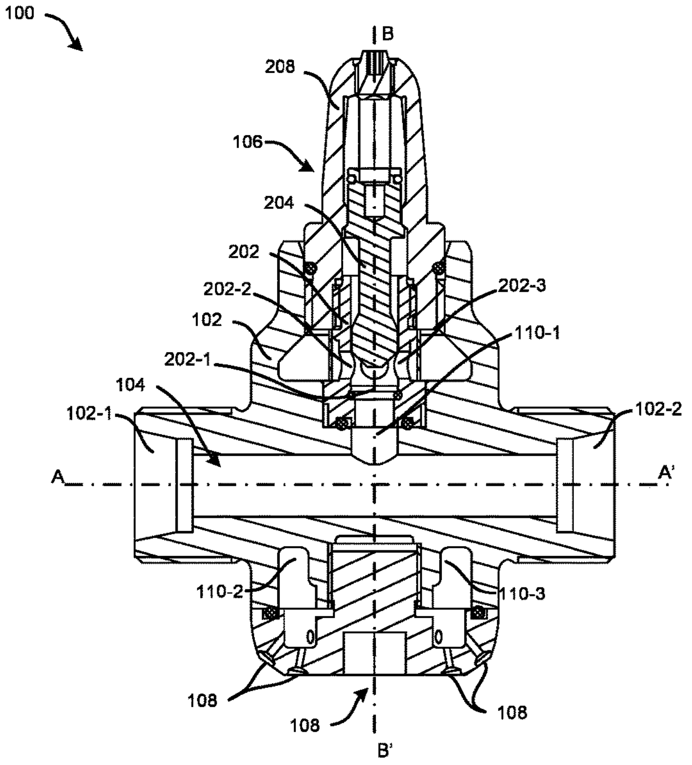
FIGS. 2C and 2D illustrate exemplary cross-sectional views of the sprinkler of FIG. 1A in an activated state, respectively, in accordance with one or more embodiments of the disclosure.
Figure 2D:
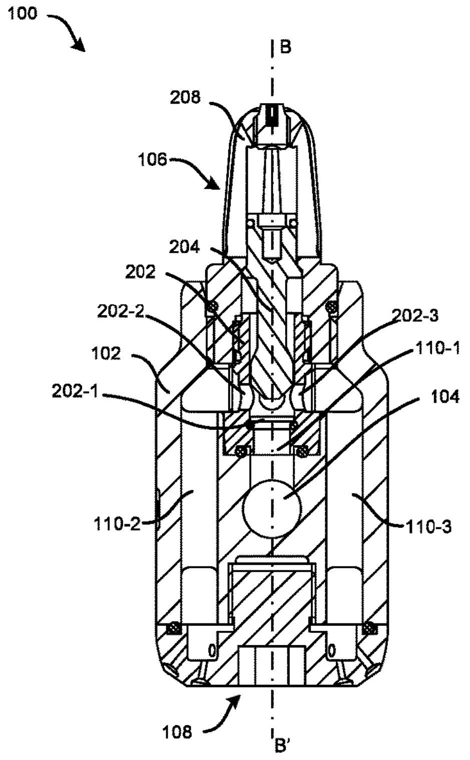

The heat-sensitive valve assembly 106 may further include a spindle 204 that may be coaxially disposed of within the annular channel of the filter plug 202, along the vertical axis B-B'. The spindle 204 may be configured to move between a deactivated position and an activated position to switch the sprinkler 100 between a deactivated state and an activated state, respectively. Referring to FIGS. 2A and 2B, the deactivated position may correspond to a position where the spindle 204 remains completely disposed within the channel of the filter plug 202 to block the openings 202-1 to 202-3 of the filter plug 202 and fluidically disconnect the first fluidic path 110-1 and the second fluidic paths 110-2, 110-3 of the channels, thereby fluidically disconnecting the nozzle arrangement 108 from the conduit 104. Further, referring to FIGS. 2C and 2D, the activated position may correspond to a position where the spindle 204 moves away (upward) from the deactivated position to unblock the openings 202-1 to 202-3 of the filter plug 202 and fluidically connect the first fluidic path 110-1 to the second fluidic paths 110-2, 110-3 via the openings 202-1 to 202-3 of the plug 202, thereby fluidically connecting the conduit 104 with the nozzle arrangement 108.

The heat-sensitive valve assembly 106 may include a heat-sensitive element 206 connected to the spindle 204 and configured to retain the spindle 204 in the deactivated position when the sprinkler 100 is in the deactivated state as shown in FIGS. 2A and 2B. Further, when the temperature of the heat-sensitive element 206 or the ambient temperature of the sprinkler 100 exceeds a predefined value, the sprinkler 100 may switch to the activated state where the heat-sensitive element 206 may break deform or break to enable automated movement of the spindle 204 to the activated position. The valve assembly 106 may include a frame "cage" 208 accommodating the heat-sensitive element 206, the filter plug 202, and the spindle 204. The frame 208 may facilitate coupling of the valve assembly 106 to the top end 102-3 of the housing 102 such that the heat-sensitive element 206 may extend between a first end (top end) of the spindle 204 and a top inner side of the frame 208 and a second end of the spindle 204 may remain movably disposed of within the channels 110 of the filter plug 202 using a biasing element (spring) (not shown) such that upon the deforming or breaking of the heat sensitive element 206, the biasing element (spring) and/or a pressurized fluid (gas or water) present in the conduit 104 may enable automated movement of the spindle 204 to the activated position.

In one or more embodiments, the heat-sensitive element 206 may be a bulb filled with a heat-sensitive material that may be adapted to explode or expand to break the glass when the temperature of the heat-sensitive material exceeds the predefined value. In other embodiments, (not shown) the heat-sensitive element may also be a fusible material that may be adapted to deform or break when the temperature of the fusible material exceeds the predefined value. As a result, upon the deforming or breaking of the heat-sensitive element 206, a force created by the biasing element (spring) and/or the pressurized fluid may enable automated movement of the spindle 204 to the activated position, thereby switching the sprinkler 100 to the activated state. In the activated state, the sprinkler 100 may allow the fluid to flow from the conduit 104 into the nozzle arrangement 108 via the channels 110 of the housing 102 and the unblocked openings of the filter plug 202, thereby spraying the fluid in predefined downward-facing angles through the orifices of the nozzle arrangement 108 and without any obstruction or shadowing.

In one or more embodiments, the sprinkler 100 may be fluidically connected to a fluid source by a dry conduit system comprising an isolation valve (not shown). The inlet 102-1 and outlet 102-2 of the conduit 104 of the sprinkler 100 may facilitate the fluidic connection of the sprinkler 100 (or multiple sprinklers) to the fluid source by the dry conduit system, where the conduit 104 and the conduit system may be filled with a pressurized gas (pressurized water in case of a wet conduit system) that may signal and facilitate actuation of the isolation valve to a closed position to restrict the flow of the fluid between the fluid source and the sprinkler 100 when the temperature of the heat-sensitive element 206 associated with the sprinkler 100 is below the predefined value. Further, when the temperature of the heat-sensitive element 206 associated with the sprinkler 100 exceeds the predefined value, the sprinkler 100 may switch to the activated state where the sprinkler 100 releases the pressurized gas via the nozzle arrangement 108 which may signal and facilitate actuation of the isolation valve to an open position to allow the flow of the fluid from the fluid source into the sprinkler 100 through the conduit system and further spray the fluid through the nozzle arrangement 108.

Initially, when the temperature of the heat-sensitive element 206 associated with the sprinkler 100 exceeds the predefined value, the sprinkler 100 in the activated state may allow the pressurized gas of the conduit system to flow from the conduit 104 into the nozzle arrangement 108 via the channels of the housing 102 and the unblocked openings of the filter plug 202, thereby releasing the pressurized gas through the orifices/holes 108-1 of the nozzle arrangement 108. This drop in pressure of the gas may signal and trigger the isolation valve to open and allow an automated flow of the fluid from the fluid source into the sprinkler 100 through the conduit system and further enable the spraying of the fluid in predefined downward-facing angles through the orifices/holes 108-1 of the nozzle arrangement 108 and without any obstruction or shadowing.

In addition, the sprinkler 100 may also allow the replacement or removal of the nozzle arrangement 108 from the housing 102 of the sprinkler 100 without any leakage of the fluid when the sprinkler 100 is connected to the pressurized conduit system in the deactivated state, as the spindle 204 and filter plug 202 of the valve assembly 106 keep the nozzle arrangement 108 fluidically disconnected from the conduit 104 during the deactivated state.

In one or more embodiments, the housing/sprinkler body 102 may be made of stainless steel or brass, but not limited to the like. Further, the nozzle arrangement 108 and components of the valve assembly 106 (except the heat-sensitive element 206) may be made of nickel-coated brass, but not limited to the like. The material for the heat-sensitive element 206 may be selected based on activation temperature or the predefined temperature selected for the sprinkler 100. In addition, the sprinkler 100 may include one or more rubber seals or O-rings configured between the filter plug 202 and the housing 102, the nozzle arrangement 108 and the housing 102, the frame 208 of the valve assembly 106 and the housing 102, and the spindle 204 and the housing 102, to restrict leakage of fluid. Further, the size and orientation of the orifices/holes 108-1 associated with the nozzle arrangement 108 may be selected based on downward-facing spraying angles and different spray patterns to be achieved.

In one or more embodiments, (not shown) a sprinkler system including multiple sprinklers 100 being installed at an area of interest (AOI) is also disclosed herein. The sprinkler system may include multiple sprinklers of FIG. 1A, which may be fluidically connected to each other and a fluid source by a conduit system. The sprinkler may be positioned at predefined locations at the AOI such that sprinklers may spray the fluid across the entire AOI. In one or more embodiments, the sprinklers may be fluidically connected to the fluid source by a dry conduit system comprising one or more isolation valve, where the conduit of each of the sprinklers and the conduit system may be filled with pressurized gas that may trigger the isolation valve(s) to restrict the flow of the fluid between the fluid source and the sprinklers when the temperature of the heat-sensitive element associated with the corresponding sprinkler is below a predefined value. Further, when the temperature of the heat-sensitive element associated with any of the one or more sprinklers exceeds the predefined value, the corresponding sprinklers may switch to the activated position to release the pressurized gas via the nozzle arrangement which may trigger the isolation valve(s) to allow the flow of the fluid from the fluid source to the nozzle arrangement through the conduit system and further allow spraying of the fluid from the activated sprinklers. In other embodiments, the sprinklers may be fluidically connected to the fluid source by a wet conduit system, where the conduit of each of the sprinklers and the conduit system may be filled with a pressurized water.

Thus, the invention provides a simple, reliable, efficient, and cost-effective upright sprinkler that enables downward spraying at all angles and has no spray pattern shadowing or obstruction issues. In addition, the upright sprinkler also allows easier replacement of the heat-sensitive member and the nozzle arrangement from the sprinkler body for different sprinkler variations and different spray patterns, without completely replacing the overall sprinkler. Moreover, the sprinkler also allows the replacement of the nozzle arrangement from the housing when the sprinkler is in a pressurized or installed state While the invention has been described with reference to exemplary embodiments, it will be understood by those skilled in the art that various changes may be made and equivalents may be substituted for elements thereof without departing from the scope of the invention as defined by the appended claims. Modifications may be made to adopt a particular situation or material to the teachings of the invention without departing from the scope thereof. Therefore, it is intended that the invention not be limited to the particular embodiment disclosed, but that the invention includes all embodiments falling within the scope of the invention as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. A sprinkler comprising:
- a housing comprising a conduit extending therethrough;
- a heat-sensitive valve assembly configured above the conduit; and
- a nozzle arrangement comprising one or more orifices, configured below the conduit;
- wherein the nozzle arrangement is fluidically connected to the conduit via the valve assembly, such that actuation of the valve assembly enables flow of a fluid from the conduit to the nozzle arrangement via the valve assembly and further sprays the fluid through the nozzle arrangement.

2. The sprinkler of claim 1, wherein the housing comprises one or more channels extending between the conduit and the nozzle arrangement within the housing, to fluidically connect the nozzle arrangement to the conduit.

3. The sprinkler of claim 2, wherein the one or more channels comprise a first fluidic path that extends upward from the conduit and at least one second fluidic path that diverges downward from the first fluidic path into the nozzle arrangement.

4. The sprinkler of claim 1, wherein the valve assembly comprises:
- a filter plug comprising one or more openings, the filter plug is adapted to be disposed of within at least a portion of the one or more channels such that the nozzle arrangement remains fluidically connected to the conduit via the one or more openings of the filter plug; and
- a spindle coaxially disposed of within the filter plug,
- wherein the spindle is configured to move between a deactivated position where the spindle blocks the one or more openings of the filter plug to fluidically disconnect the nozzle arrangement from the conduit, and an activated position where the spindle moves away from the deactivated position to unblock the one or more openings of the filter plug and fluidically connect the conduit with the nozzle arrangement.

5. The sprinkler of claim 1, wherein the valve assembly comprises a heat-sensitive element connected to the spindle and configured to retain the spindle in the deactivated position, and wherein when a temperature of the heat-sensitive element exceeds a predefined value, the heat-sensitive element is adapted to deform or break, thereby enabling automated movement of the spindle to the activated position.

6. The sprinkler of claim 1, wherein the valve assembly comprises a frame accommodating the heat sensitive element, the filter plug, and the spindle, wherein the frame facilitates coupling of the valve assembly to a top end of the housing.

7. The sprinkler of claim 1, wherein the heat-sensitive element is configured between a first end of the spindle and a top inner side of the frame, wherein a second end of the spindle is movably disposed of within the filter plug using a biasing element such that upon the deforming or breaking of the heat sensitive element, the biasing element and/or a pressurized fluid present in the conduit enables automated movement of the spindle to the activated position.

8. The sprinkler of claim 1, wherein the heat-sensitive element is a bulb filled with a heat-sensitive material that is adapted to explode or expand to break the glass when the temperature of the heat-sensitive material exceeds the predefined value.

9. The sprinkler of claim 1, wherein the heat-sensitive element is a fusible material that is adapted to deform or break when the temperature of the fusible material exceeds the predefined value.

10. The sprinkler of claim 1, wherein the valve assembly comprises a filter mesh configured at the one or more openings of the filter plug.

11. The sprinkler of claim 1, wherein the valve assembly is adapted to be removably coupled to a top end of the housing such that the conduit remains fluidically connected to the one or more channels and the nozzle arrangement via the valve assembly.

12. The sprinkler of claim 1, wherein the nozzle arrangement is adapted to be removably coupled to a bottom end of the housing such that the nozzle arrangement remains fluidically connected to the one or more channels.

13. The sprinkler of claim 12, wherein the nozzle arrangement is removably coupled to a bottom end of the housing such that actuation of the valve assembly enables spraying of the fluid, through the nozzle arrangement, at predefined angles in a downward direction.

14. The sprinkler of claim 1, wherein the conduit comprises an inlet and an outlet that are adapted to be fluidically coupled to a fluid source.

15. The sprinkler of claim 14, wherein the sprinkler is fluidically connected to the fluid source by a dry conduit system comprising an isolation valve, wherein the conduit and the conduit system is filled with a pressurized gas that facilitates actuation of the isolation valve to a closed position to restrict the flow of the fluid between the fluid source and the sprinkler when the temperature of the heat-sensitive element associated with the sprinkler is below the predefined value.

16. The sprinkler of claim 15, wherein when the temperature of the heat-sensitive element associated with the sprinkler exceeds the predefined value, the sprinkler is configured to release the pressurized gas via the nozzle arrangement which facilitates actuation of the isolation valve to an open position to allow the flow of the fluid from the fluid source to the nozzle arrangement through the conduit system.

17. A sprinkler system comprising:

one or more sprinklers fluidically connected to each other and a fluid source, wherein each of the sprinklers comprises:

a housing comprising a conduit extending therethrough;

a heat-sensitive valve assembly configured above the conduit; and a nozzle arrangement comprising one or more orifices configured below the conduit;

wherein the nozzle arrangement is fluidically connected to the conduit via the valve assembly, such that actuation of the valve assembly enables flow of a fluid from the conduit to the nozzle arrangement via the valve assembly and further sprays the fluid through the nozzle arrangement.

18. The sprinkler system of claim 17, wherein the conduit of each of the sprinklers comprises an inlet and an outlet that facilitates fluidic coupling of the one or more sprinklers with each other and the fluid source.

19. The sprinkler system of claim 17, wherein the one or more sprinklers are fluidically connected to the fluid source by a dry conduit system comprising one or more isolation valve, wherein the conduit of each of the sprinklers and the dry conduit system is filled with a pressurized gas that facilitates actuation of the one or more isolation valve to a closed position to restrict the flow of the fluid between the fluid source and the one or more sprinklers when the temperature of the heat-sensitive element associated with the corresponding sprinkler is below the predefined value, and wherein when the temperature of the heat-sensitive element associated with any of the one or more sprinklers exceeds the predefined value, the corresponding sprinklers are configured to release the pressurized gas via the nozzle arrangement which facilitates actuation of the one or more isolation valve to an open position to allow the flow of the fluid from the fluid source to the nozzle arrangement through the conduit system.

20. The sprinkler system of claim 17, wherein the housing of each of the sprinklers comprises one or more channels extending between the conduit and the nozzle arrangement within the housing, to fluidically connect the nozzle arrangement to the conduit, wherein the one or more channels comprise a first fluidic path that extends upward from the conduit and at least one second fluidic path that diverges downward from the first fluidic path into the nozzle arrangement.

* * * * *